United States Patent Office 3,365,588
Patented Jan. 23, 1968

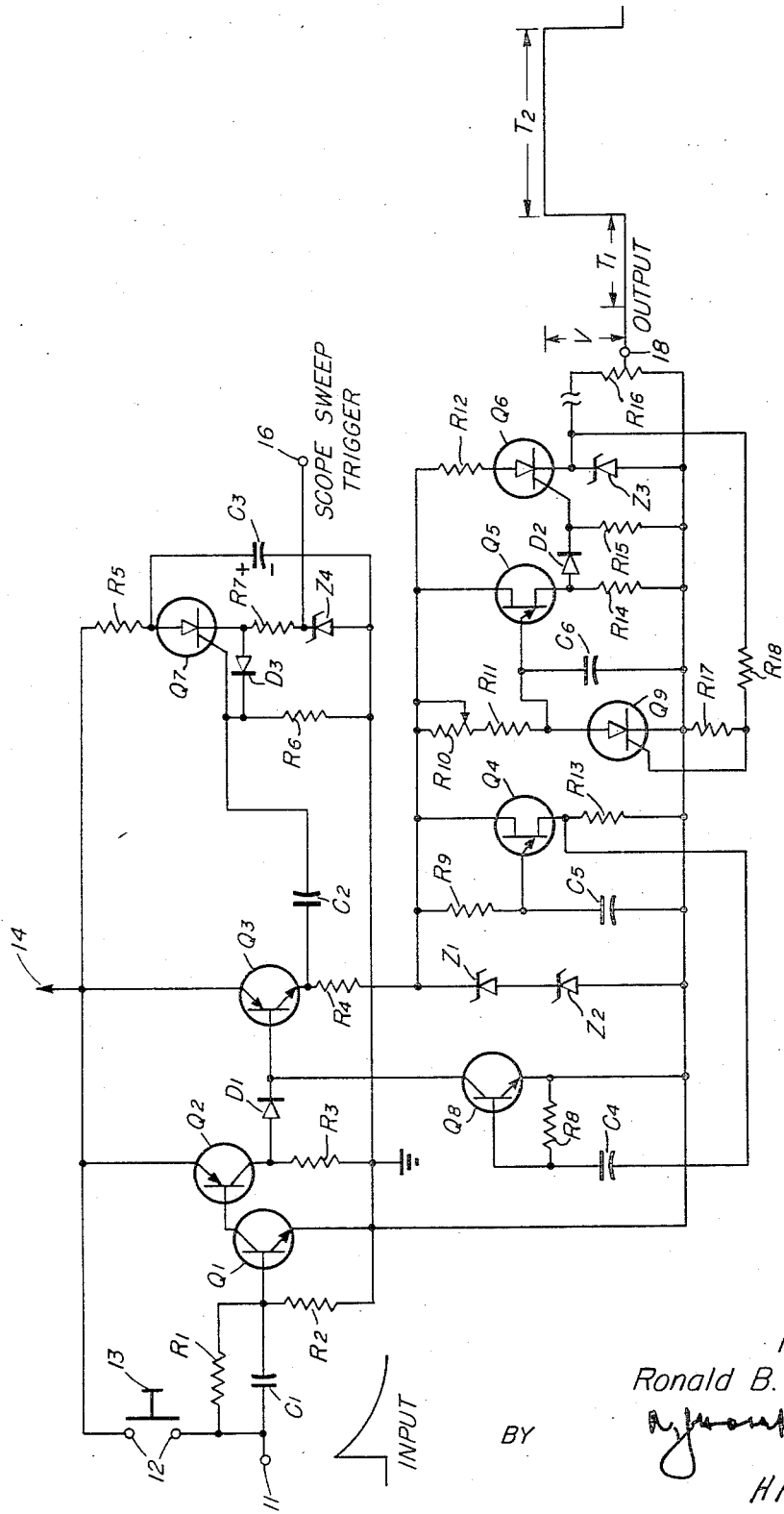

3,365,588
MULTI-CHANNEL CALIBRATION CIRCUIT FOR GENERATING A STEP-WAVE OUTPUT VOLTAGE
Ronald B. Tuesing, College Park, Md., assignor to the United States of America as represented by the Secretary of the Navy
Filed July 26, 1965, Ser. No. 475,026
10 Claims. (Cl. 307—264)

ABSTRACT OF THE DISCLOSURE

A step-wave generator network having a pair of transistors, a trigistor, a pair of Zener diodes, and two unijunction transistor time delay circuits. The transistors are employed to turn on the trigistor and bring the Zener diodes up to their regulating voltages upon which the unijunction transistor time delay circuits are sequentially activated to provide an accurate baseline or foot of the output pulse and an accurate amplitude level and horizontal timing for the duration of the pulse.

---

The invention described herein may be manufactured and used by or for the Government of the United States of America for governmental purposes without the payment of any royalties thereon or therefor.

This invention relates to a solid state generator circuit and more particularly to a solid state generator circuit which provides an accurate and stable output reference step voltage for calibration purposes.

In the underwater explosions field extreme accuracy is needed in calibrating sources such as vertical amplitude and horizontal timing when recording underwater shock phenomena. Normally an amplitude calibration generator of the Q-step type is used in calibrating recording system gages, cables, RC cable terminations, and vertical inputs of the oscilloscopes. Ideally the Q-step generator has an output which provides a base line reference or foot voltage for a predetermined time then steps up to a predetermined output voltage and maintains this voltage for the duration of the output step.

In the past Q-step generators have used relays or vacuum tubes for switching the reference voltage on and off. Reference voltages were established by using voltage regulator tubes or standard batteries with voltage dividers, made up of resistors in series or a potentiometer and resistors in series, were used to get variable output voltages. With the voltage regulator type a negative voltage was removed to give the necessary positive oscilloscope deflections since the starting voltage of a voltage regulator tube is considerably higher than its quiescent regulating voltage. Voltage removal with the relay type provides the relay with less contact chatter on a break than on a make giving a faster clean voltage step. These generators were not satisfactory in providing highly accurate step voltages, however, because with negative voltage removal, the maximum output voltage and minimum output resistance were limited by the resistances of the voltage dividers. The rise times depended on the speed of the switching devices, and with the relay type the shortest base line or foot was limited to a few milliseconds. Physically the Q-step generators were large requiring large power supplies and were sensitive to environmental changes such as light, temperature, humidity, shock and vibration.

The present invention is a Q step generator which embraces all the advantages of similarly employed generators and possesses none of the aforedescribed disadvantages. To attain this, the invention contemplates a pair of transistors which are employed to turn on a trigistor and bring a pair of Zener diodes up to their regulating voltages, whereupon two unijunction time delay circuits are sequentially activated to provide an accurate base line of the output pulse and an accurate amplitude level and horizontal timing for the duration of the pulse.

Accordingly, an object of this invention is the provision of an accurate and stable reference step pulse using solid state circuit elements.

Another object of this invention is to provide a calibration reference step pulse which has an accurate base line, amplitude level and pulse duration.

Still another object is to provide a solid state transistorized step voltage generator circuit which uses Zener diodes and output potentiometers to provide stable reference voltages with environmental changes.

These and other features of the invention will hereinafter become more apparent from the following description of the annexed drawing, which illustrates one embodiment and wherein:

The figure illustrates a circuit diagram of the Q-step generator.

Referring to the figure, an input pulse is applied to terminal 11 or is supplied from battery 14 when push button 13 closes terminals 12. The input pulse is filtered by filter circuit R1, C1, places a voltage drop across resistor R2 and supplies an on signal to the base of NPN transistor Q1, which is normally in an off condition. The collector of transistor Q1 is connected to the base of PNP transistor Q2 so that when transistor Q1 is switched on transistor Q2 is also switched on. When PNP transistor Q2 is in its on condition, current from source 14 has a path through transistor Q2 and resistor R3 to ground. Battery source 14 may be on the order of 28 volts so that when transistor Q2 conducts, a 28 volt pulse is coupled through diode D1 to the gate of trigistor Q3. The transistors Q1 and Q2 act as a step pulse initiation gate to signals appearing at input 11 which when opened provides a signal to the trigistor Q3. Trigistor Q3 turns on and latches; that is, remains on without a gate signal until it receives the negative off signal. Trigistor Q3 therefore may be thought of as a latching gate.

When trigistor Q3 becomes conducting, a current path through trigistor Q3 and resistor R4 to Zener diodes Z1 and Z2 exists, wherein Zener diodes Z1 and Z2 step up to their regulating voltages. Zener diodes Z1 and Z2 supply a stable voltage, which may be on the order of 16 volts to two time delay circuits of the generator. The Zener diodes used in this embodiment may have zero temperature coefficients so that when operated at a particular constant current, reference voltage does not change with variations and temperature.

The first time delay, which corresponds to T1 shown at the output terminal 18, is provided by resistor R10, resistor R11, capacitor C6 and unijunction transistor Q5. Resistor R10 is variable providing means to vary the time delay with transistor Q5 and setting the length of the base line or foot T1. At the end of the delay, unijunction transistor Q5 becomes fully conducting, providing a positive pulse which is coupled through diode D2 to the gate of silicon controlled rectifier Q6. Diode D2 is connected between resistors R14 and R15 with resistor R14 providing a voltage drop between the anode of diode D2 and ground and resistor R15 providing a voltage drop between the cathode of diode D2 and ground.

Silicon controlled rectifier Q6 has its anode connected to resistor R12 and its cathode connected to Zener diode Z3. As silicon controlled rectifier Q6 is triggered on, Zener diode Z3 having a zero temperature coefficient steps up to its regulating voltage, which is the accurate and stable voltage V that appears across potentiometer R16. Potentiometer R16 is a single thermal mass providing additional output voltage stability. When Zener diode Z3 steps up to its voltage, silicon controlled rectifier Q9 also is triggered on by a signal over feedback resistor R18 to its gate electrode.

Silicon controlled rectifier Q9 is connected between resistor R11 and resistor R17 and upon conducting provides a current path shorting out the timing capacitor C6, thus preventing additional pulses from appearing on the output voltage step. Resistor R17 provides a voltage drop between the gate electrode of rectifier Q9 and ground. After time T1 when the output is at the voltage amplitude V, resistor R9, capacitor C5, and unijunction transistor Q4, provide a second timing delay T2. After the delay determined by delay circuit R9, C5, transistor Q4 becomes fully conductive supplying a positive output pulse to NPN transistor Q8.

Transistor Q8 which acts as a termination gate for the step wave output, has an RC circuit R8, C4 connected to its base emitter input from unijunction transistor Q4 and has its collector connected to the junction between the cathode of diode D1 and trigistor Q3. A negative pulse is supplied to the gate of trigistor Q3 placing trigistor Q3 once again in an off condition. The voltage across Zener diodes Z1 and Z2 then drops to zero and the output voltage step goes to zero.

A stable scope sweep trigger output voltage is also supplied at output terminal 16 when trigistor Q3 is on. A pulse from the output of trigistor Q3 over capacitor C2 is coupled to the gate electrode of silicon controlled rectifier Q7. SCR Q7 is connected between resistor R5 and capacitor C3 at its anode, the junction of capacitor C2 and R6 at its gate, and resistor R7 at its cathode. The silicon controlled rectifier circuit puts out a positive voltage pulse to establish zero time on the base line which is used to start the oscilloscope sweep circuits or to turn on the beams.

When silicon controlled rectifier Q7 is triggered on, it discharges capacitor C3 through Zener diode Z4 and resistor R7 with the discharge time setting the width of the pulse while Zener diode Z4 fixes the amplitude. Silicon controlled rectifier Q7 resets after capacitor C3 discharges. Diode D3 is connected between the gate and cathode of SCR Q7 to prevent undesirable back voltage between the gate and cathode.

The present invention thus provides a solid state generator circuit which supplies an accurate and stable output reference voltage step.

Various modes of carrying out the invention are contemplated as being within the scope of the following claims particularly pointing out and distinctly claiming the subject matter which is regarded as the invention.

What is claimed is:

1. A solid state step voltage generator for providing a step voltage wave comprising:
    input gating means normally in an off condition responsive to an input pulse to switch to an on condition,
    a trigistor having a gate electrode and an output electrode, said gate electrode connected to said input gating means, said trigistor biased to switch on when a pulse of one polarity is received at the gate electrode and remain on until a pulse of the opposite polarity is received at said gate electrode,
    a pair of series connected Zener diodes connected between the output electrode of said trigistor and ground,
    delay means connected in parallel with said Zener diodes for providing a first delay equal to the length of the base line portion of a step voltage wave and a second delay equal to the combined length of the base line and the stepped up portion of a step voltage wave,
    stable voltage output means for providing a step voltage wave output thereof, and
    means connected between said delay means and the gate electrode of said trigister for gating a pulse of the opposite polarity to the gate electrode of said trigistor when said second delay time has elapsed.

2. The apparatus of claim 1 wherein said stable voltage output means is a Zener diode connected in parallel with a potentiometer having an output terminal connected thereto.

3. The apparatus of claim 1 wherein said input gating means comprises two transistors connected in series and said opposite pulse polarity gating means is a transistor gate.

4. The apparatus of claim 3 wherein said stable voltage output means is a Zener diode connected in parallel with a potentiometer having on output terminal connected thereto.

5. A step voltage wave generator comprising a step pulse initiation gate, a latching gate, and a step wave termination gate,
    means connecting said initiation gate to said latching gate,
    an input terminal connected to said initiation gate,
    a reference stabilizer circuit having an input terminal connected to the output of said latching gate,
    a first time delay circuit and a second time delay circuit connected in parallel with said reference stabilizer circuit,
    step wave voltage output means having an output terminal connected thereto connected to said first time delay circuit, and
    means connecting said termination gate between said second delay circuit and said means connecting the initiation gate to the latching gate.

6. The apparatus of claim 5 further comprising a trigger circuit connected to the output of said latching gate and having an output terminal connected thereto which provides an output trigger pulse when said latching gate is open.

7. The apparatus of claim 5 further comprising means connected between said voltage output means and said first delay circuit for preventing additional output pulses from occurring at said output terminal.

8. A step wave voltage generator comprising:
    an input terminal,
    a first transistor gate connected to said input terminal,
    a trigistor having a gate electrode connected to said first transistor gate and normally biased off, responsive to turn on when a gating pulse is received from said first transistor gate circuit and to remain latched on until a pulse of opposite polarity is received at said gate electrode,
    a pair of serially connected Zener diodes connected to the output of said trigistor,
    a first resistor-capacitor circuit connected in parallel with said Zener diodes,
    a first unijunction transistor having a gate electrode connected to said first resistor-capacitor circuit and biased to provide an output pulse after a first predetermined time delay,
    a first silicon controlled rectifier having a cathode electrode, an anode electrode, and a control electrode,
    a Zener diode connected between the cathode electrode and one terminal of said pair of Zener diodes, said anode electrode connected to the other terminal of said serially connected Zener diodes and said control electrode connected to the output of said first unijunction transistor,
    a potentiometer connected in parallel with said Zener diode and having an output terminal connected thereto,
    a second time delay circuit connected in parallel with said serially connected Zener diodes,
    a second unijunction transistor having its gate electrode connected to said second time delay circuit and biased to provide an output pulse after a second predetermined time delay, a second transistor gate normally biased off connected between said trigistor input gate and the output of said second unijunction transistor providing a gating pulse of opposite polarity to said first transistor gating pulse when turned on, whereby said generator provides at the output terminal of said potentiometer a step wave output having a base line equal in length to said first time delay, a step voltage amplitude equal to the voltage across said Zener diode after said first time delay for a duration of time equal to the difference between said second time delay and said first time delay.

9. The apparatus of claim 8 further comprising a second silicon controlled rectifier having an anode electrode, a cathode electrode, and a gate electrode, said anode connected to the junction between the resistor and the capacitor of said first resistor-capacitor time delay circuit and said cathode connected to ground and said gate electrode connected to the cathode of said first silicon control rectifier.

10. The apparatus of claim 9 further comprising, a third silicon controlled rectifier having a cathode electrode, an anode electrode, and a gate electrode, a Zener diode, a capacitor, a resistor and a semiconductor diode, said gate electrode connected to the output of said trigistor, said capacitor connected between the anode electrode and the anode electrode of said silicon control rectifier and the anode electrode of said Zener diode, said resistor connected between the cathode electrodes of said silicon control rectifier and said Zener diode, and said semiconductor diode connected between the cathode electrode of said silicon control rectifier and said gate electrode.

No references cited.

ARTHUR GAUSS, *Primary Examiner.*

S. D. MILLER, *Assistant Examiner.*